United States Patent Office 3,311,616
Patented Mar. 28, 1967

3,311,616
13β-n-PROPYL-18,19-BIS-NOR-PROGESTERONE
AND PROCESS OF PREPARATION
Gerard Nomine, Noisy-le-Sec, Robert Bucourt, Clichy-sous-Bois, and Jacques Dube, Eaubonne, France, assignors to Roussel-UCLAF, Paris, France, a corporation of France
No Drawing. Filed Mar. 16, 1965, Ser. No. 440,273
15 Claims. (Cl. 260—239.5)

The present invention relates to an 18,19-bis-nor-progesterone alkylated in the 13 position, specifically optically active 13β-n-propyl - 18,19 - bis-nor progesterone of Formula I:

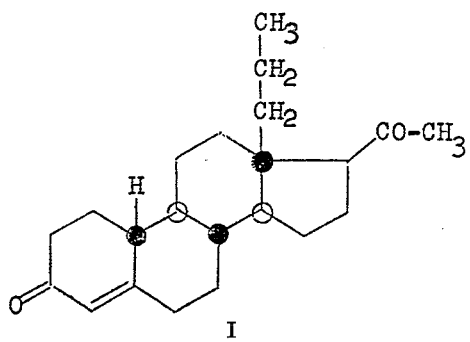

I as well as a process of producing this compound.

The invention also includes, as new industrial products, the intermediary products in the preparation of Compound I, according to the process described hereafter.

An object of the present invention is the obtention of 13β-n-propyl-18,19-bis-nor-progesterone of the formula

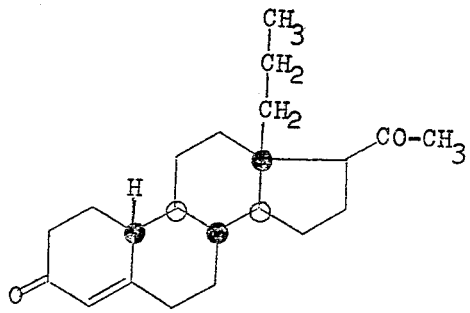

Another object of the present invention is the development of a process for the production of 13β-n-propyl-18,19-bis-nor-progesterone of the formula

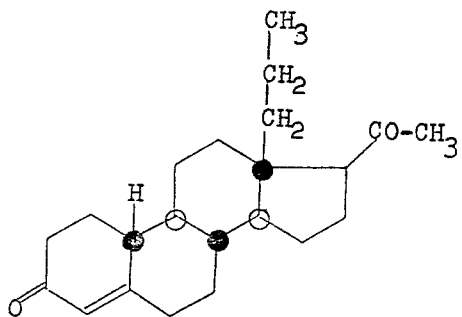

which comprises the steps of:

(a) Reacting 5 - methoxy - 13β-n-propyl-$\Delta^{5,7,9}$-des-A-gonatriene-17β-ol with an oxidizing agent, (b) Ethynylating the resulting 5-methoxy-13β-n-propyl-$\Delta^{5,7,9}$-des-A-gonatriene-17-one by the action of an ethynylating agent, (c) Esterifying the resulting 5-methoxy-13β-n-propyl-17α-ethynyl-$\Delta^{5,7,9}$-des-A-gonatriene-17β-ol by the action of an esterifying derivative of an organic carboxylic acid having from 2 to 7 carbon atoms, (d) Hydrating the ethynyl function of the resulting ester of the formula

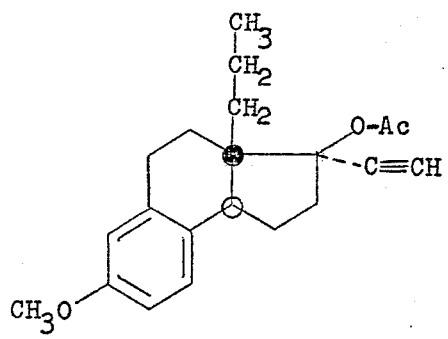

wherein Ac represents the acyl of an organic carboxylic acid having from 2 to 7 carbon atoms, by the action of water in the presence of a hydration catalyst, (e) Reducing the resulting 17α-acetyl-gonatriene of the formula

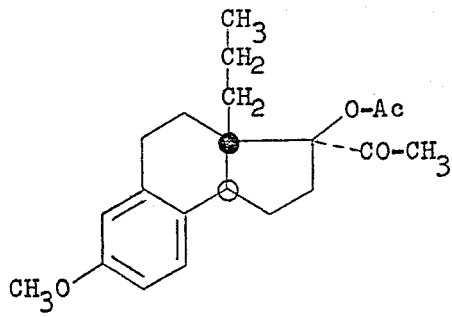

wherein Ac represents the acyl of an organic carboxylic acid having from 2 to 7 carbon atoms, by the action of an alkali metal in liquid ammonia and subjecting the resulting product to an acid hydrolysis, (f) Reacting the resulting 13β-n-propyl-18,19-bis-nor-$\Delta^9$-des-A-pregnene-20-ol-5-one with an oxidizing agent, (g) Reacting the resulting 13β-n-propyl-18,19-bis-nor-$\Delta^9$-des-A-pregnene-5,20-dione with a secondary amine of the formula

wherein R and $R_1$ are members selected from the group consisting of alkyl having from 1 to 8 carbon atoms and, when taken together with the nitrogen, pyrrolidyl, piperidyl and morpholyl, (h) Reacting the resulting enamine of the formula

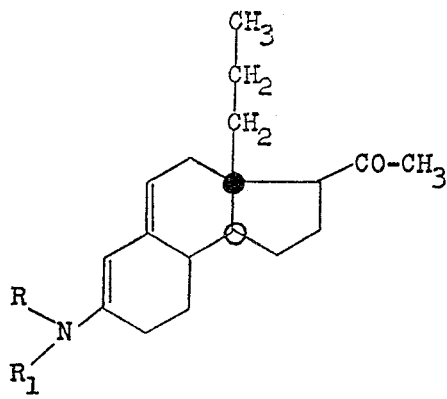

wherein R and R₁ are members selected from the group consisting of alkyl having from 1 to 8 carbon atoms and, when taken together with the nitrogen, pyrrolidyl, piperidyl and morpholyl, with 1-halo-3-chloro-2-butene in an organic solvent.

(i) Reacting the resulting 3-chloro-13β-n-propyl-18,19-bis-nor-4,5-seco-Δ²,⁹-pregnadiene-5,20-dione with an acid hydrolyzing agent, (j) Reducing the resulting 13β-n-propyl-18,19-bis-nor-4,5-seco-Δ⁹-pregnene-3,5,20-trione by the action of hydrogen in the presence of a hydrogenation catalyst, (k) Cyclizing the resulting 13β-n-propyl-18,19-bis-nor-4,5-seco-pregnane-3,5,20-trione by the action of a cyclizing agent selected from the group consisting of acidic and basic cyclizing agents, and (l) Recovering said 13β-n-propyl-18,19-bis-nor-progesterone.

A further object of the invention is the obtention of the novel intermediates:

(a) 5-methoxy-13β-n-propyl-Δ⁵,⁷,⁹-des-A-gonatriene-17-one
(b) 5-methoxy-13β-n-propyl-17α-ethynyl-Δ⁵,⁷,⁹-des-A-gonatriene-17β-ol
(c) An ester of the formula

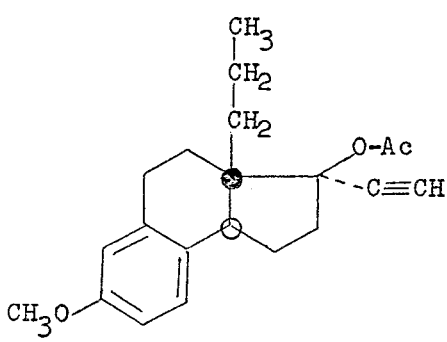

wherein Ac represents the acyl of an organic carboxylic acid having from 2 to 7 carbon atoms, (d) 17α-acetyl-gonatriene of the formula

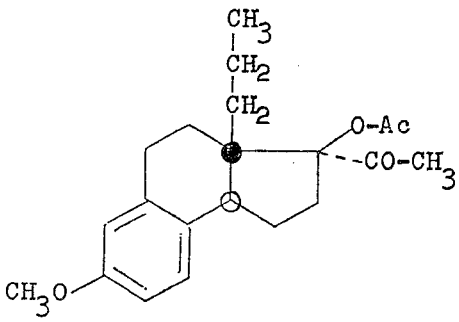

wherein Ac represents the acyl of an organic carboxylic acid having from 2 to 7 carbon atoms, (e) 13β-n-propyl-18,19-bis-nor-Δ⁹-des-A-pregnene-20-ol-5-one,
(f) 13β-n-propyl-18,19-bis-nor-Δ⁹-des-A-pregnene-5,20-dione
(g) An enamine of the formula

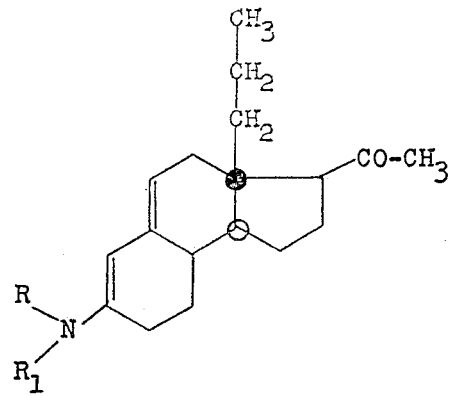

wherein R and R₁ are members selected from the group consisting of alkyl having from 1 to 8 carbon atoms and, when taken together with the nitrogen, pyrrolidyl, piperidyl and morpholyl, (h) 3-chloro-13β-n-propyl-18,19-bis-nor-4,5-seco-Δ²,⁹-pregnadiene-5,20-dione,
(i) 13β-n-propyl-18,19-bis-nor-4,5-seco-Δ⁹-pregnene-3,5,20-trione
(j) 13β-n-propyl-18,19-bis-nor-4,5-seco-pregnane-3,5,20-trione
(k) 3-pyrrolidyl-13β-n-propyl-18,19-bis-nor-Δ³,⁵-pregnadiene-20-one.

These and other objects of the invention will become more apparent as the description thereof proceeds.

The compound of Formula I, 13β-n-propyl-18,19-bis-nor-progesterone having a specific rotation $$/\alpha/_D = +149.5° \pm 1 \quad (c. = 0.47\% \text{ in methanol})$$

presents the stereochemical configuration of the natural steroids.

This compound possesses interesting physiological properties. 13β-n-propyl-18,19-bis-nor-progesterone is devoid of all progestomimetic activity at customary doses when administered orally, on the other hand, it has a remarkable *anti-androgenic effect*. Thus, when administered at the same time as a product having an androgenic and an anabolic activity such as testosterone acetate, it reduces the effects of the latter on the sexual receptors by about 50% without modifying the anabolic effect.

The process of preparing the 13β-n-propyl-18,19-bis-nor-progesterone, also an object of the invention, is summarized by the flow diagram of the table.

TABLE
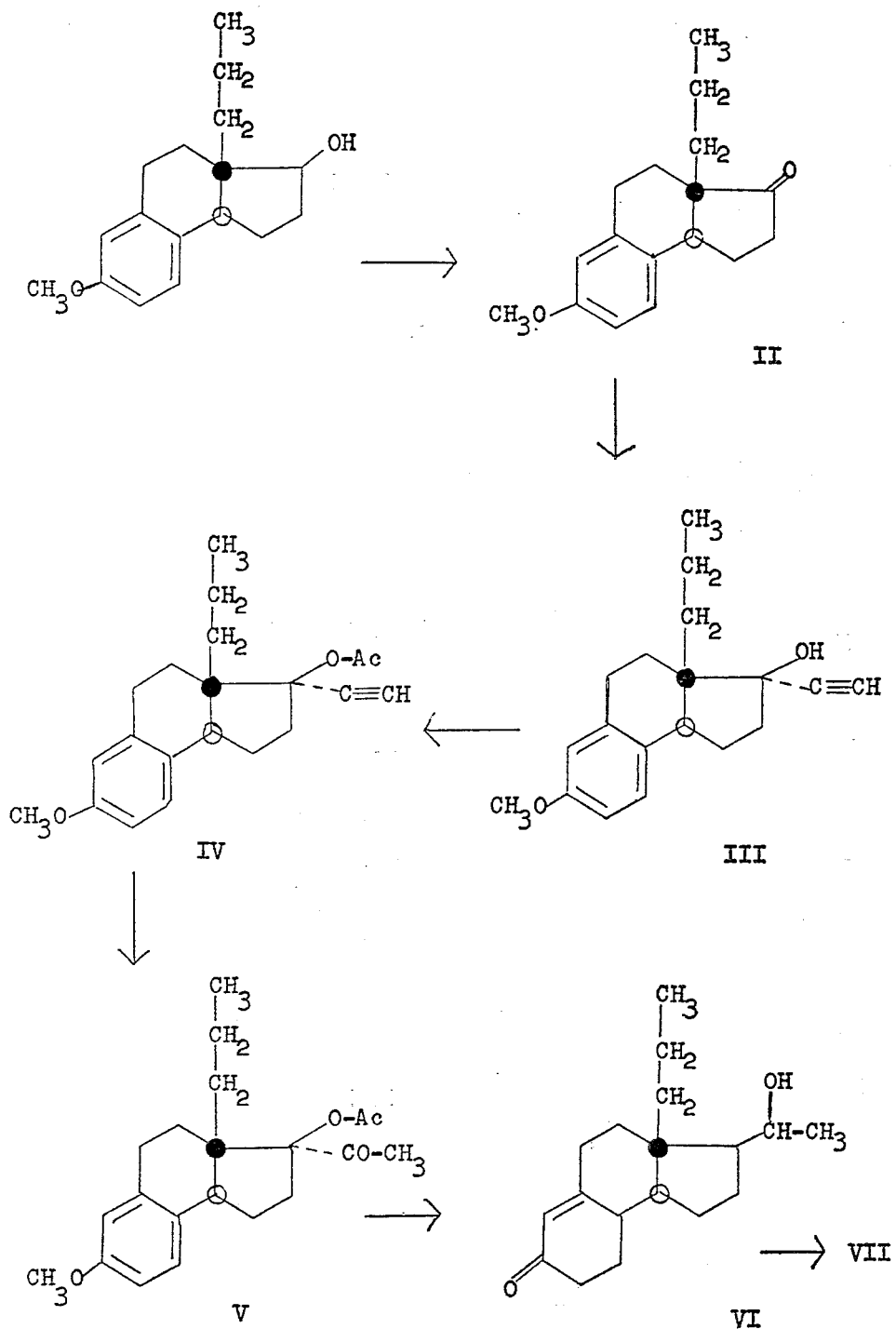

TABLE—Continued
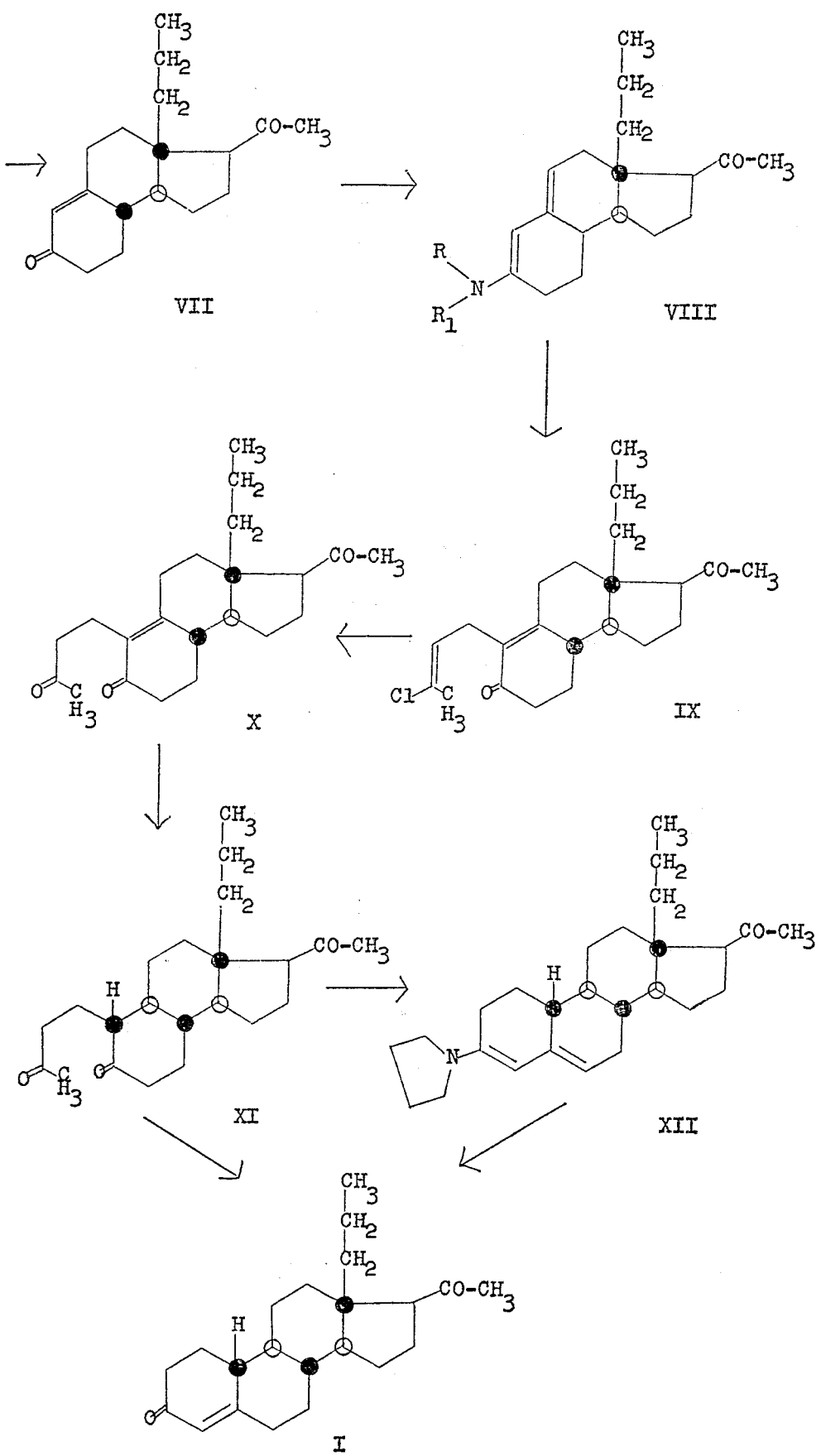

Ac represents the acyl of an organic carboxylic acid having from 2 to 7 carbon atoms.

R and R₁ are members selected from the group consisting of alkyl having from 1 to 8 carbon atoms and, when taken together with the nitrogen, pyrrolidyl, piperidyl and morpholyl.

This process is essentially characterized in that 5-methoxy-13β-n-propyl-Δ$^{5,7,9}$-des-A-gonatriene - 17β - ol is subjected to the action of an oxidizing agent under the usual conditions to oxidize the hydroxy group to a ketone. An ethynylating agent is reacted with the resultant 5-methoxy-13β-n-propyl-Δ$^{5,7,9}$-des-A-gonatriene-17-one (II), thus obtaining 5-methoxy-13β-n-propyl - 17α - ethynyl-Δ$^{5,7,9}$-des-A-gonatriene-17β-ol (III). This latter compound is esterified with the aid of a functional derivative of an organic carboxylic acid having from 2 to 7 carbon atoms to give a 5-methoxy-13β-n-propyl-17β-acyloxy-17α-ethynyl-Δ$^{5,7,9}$-des-A-gonatriene (IV). The ethynyl function of this ester is catalytically hydrated to give a 5-methoxy - 13β - n - propyl-17β-acyloxy-17α-acetyl-Δ$^{5,7,9}$-des-A-gonatriene (V). This Compound V is reduced by means of an alkali metal in liquid ammonia; next an acid hydrolysis is effected, thus giving 13β-n-propyl-18,19-bis-nor-Δ$^9$-des-A-pregnene-20-ol-5-one (VI), which is subjected to the action of an oxidizing agent. The resultant 13β-n-propyl-18,19-bis-nor-Δ$^9$-des-A-pregnene-5,20 - dione (VII), is reacted with a secondary amine of the formula:

in which, as well as in the following, R and R₁, which may be identical or different, are members selected from the group consisting of alkyl having from 1 to 8 carbon atoms, and, when taken together with the nitrogen, pyrrolidyl, piperidyl and morpholyl, which leads to the 5-enamino-13β-n-propyl - 18,19-bis-nor-Δ$^{5(10),9(11)}$-des-A-pregnadiene-20-one (VIII). This enamine is condensed with a 1-halo-3-chloro-2-butene to give 3-chloro-13β-n-propyl-18,19-bis-nor-4,5-seco-Δ$^{2,9}$-pregnadiene-5,20-dione (IX). This last product is reacted with an acid hydrolyzing agent to obtain 13β-n-propyl - 18,19-bis-nor-4,5-seco-Δ$^9$-pregnene-3,5,20-trione (X), which is reduced by catalytic hydrogenation to 13β-n-propyl-18,19-bis - nor - 4,5 - seco-pregnane-3,5,20-trione (XI). This latter is subjected to the action of an acid or basic cyclizating agent and the desired 13β-n-propyl-18,19-bis-nor-progesterone, I, is obtained.

The performance of the process of invention may be characterized advantageously by the following points.

(a) The oxidizing agent utilized to oxidize the hydroxyl group of 5-methoxy-13β-n-propyl-Δ$^{5,7,9}$-des-A-gonatriene-17β-ol into the 17 ketone, is preferably chromic acid anhydride, and the reaction is conducted in the presence of sulfuric acid in an acetonic media;

(b) The ethynylating agent, which is allowed to act upon the 5-methoxy-13β-n-propyl-Δ$^{5,7,9}$-des-A-gonatriene-17-one (II) can be any ethynylating agent conventionally used to ethynylate a 17 ketone steroid, however it is preferable to utilize an alkali metal acetylide in an organic solvent, such as lithium acetylide in a benzene-tetrahydrofuran media.

(c) 5 - methoxy - 13β-n-propyl-17α-ethynyl-Δ$^{5,7,9}$-des-A-gonatriene-17β-ol (III), is esterified by means of a functional derivative, such as an acid chloride or an acid anhydride, of an organic carboxylic acid having from 2 to 7 carbon atoms. When the reaction is conducted with acetic acid anhydride, it is preferable to conduct the same in the presence of a strongly acidic catalyst, such as p-toluene sulfonic acid.

(d) The ethynyl function of the 5-methoxy-13β-n-propyl - 17β - acyloxy-17α-ethynyl-Δ$^{5,7,9}$-des-A-gonatriene (IV), is hydrated according to conventional methods in steroid chemistry. Preferably the reaction is conducted in a dilute alkanolic media, in the presence of a hydration catalyst, such as a mercury salt of p-toluene-sulfonamide or an ion exchange resin containing mercuric cations.

(e) The reduction of the 5-methoxy-13β-n-propyl-17β-acyloxy-17α-acetyl-Δ$^{5,7,9}$-des-A-gonatriene (V), by means of an alkali metal in liquid ammonia is preferentially conducted by means of lithium in liquid ammonia in the presence first of ether, then of methanol, this reducing treatment being followed by hydrolysis with a strong acid, such as a strong mineral acid, for example aqueous hydrochloric acid.

(f) The oxidizing agent used to oxidize the 20 hydroxyl group of 13β-n-propyl-18,19-bis-nor-Δ$^9$-des-A-pregnene-20-ol-5-one (VI), is preferably chromic acid anhydride, and the reaction is conducted in the presence of sulfuric acid in an acetonic media.

(g) The secondary amine which is reacted with 13β-n-propyl-18,19-bis-nor-Δ$^9$-des-A-pregnene-5,20-dione (VII), is preferably pyrrolidine and the reaction is conducted at an elevated temperature up to the reflux temperature.

(h) The 1-halo-3-chloro-2-butene which is condensed with the 5-enamino-13β-n-propyl-18,19-bis-nor-Δ$^{5(10),9(11)}$-des-A-pregnadiene-20-one (VIII) is 1,3-dichloro-2-butene and the reaction is conducted in dimethylformamide in the presence of potassium iodide.

(i) The acid hydrolyzing agent which is reacted with 3 - chloro - 13β - n - propyl - 18,19 - bis-nor-4,5-seco-Δ$^{2,9}$-pregnadiene-5,20-dione (IX), is a strong mineral acid such as sulfuric acid.

(j) The catalytic hydrogenation of 13β-n-propyl-18,19-bis-nor-4,5-seco-Δ$^9$-pregnene-3,5,20-trione (X), is accomplished in a hydroxylated solvent such as ethanol, in the presence of a small quantity of a basic reacting compound, such as a tertiary amine, for example, triethylamine and by utilizing a palladized carbon black hydrogenation catalyst.

(k) The acidic cyclizating agent which is reacted with 13β - n - propyl - 18,19 - bis-nor-4,5-seco-pregnane-3,5,20-trione (XI), is preferentially hydrochloric acid, the reaction being conducted in an acetic acid media.

(l) The basic cyclizating agent which is reacted with 13β - n - propyl - 18,19 - bis-nor-4,5-seco-pregnane-3,5,20-trione is preferentially pyrrolidine, which leads to an intermediary compound, 3-pyrrolidyl-13β-n-propyl-18,19-bis-nor-Δ$^{3,5}$-pregnadiene-20-one (XII). An acid hydrolysis of this compound, preferably by acetic acid gives the desired 13β-n-propyl-18,19-bis-nor-progesterone.

The starting product for the process described, or 5-methoxy-13β-n-propyl-Δ$^{5,7,9}$-des-A-gonatriene-17β-ol, may be prepared according to the process described in United States Patent No. 3,115,507, issued December 24, 1963.

The following example illustrates the invention. It is to be understood, however, that it presents no limiting characteristics.

EXAMPLE

*Step I: 5-methoxy-13β-n-propyl-Δ$^{5,7,9}$-des-A-gonatriene-17-one, II*

A solution of 24 gm. of 5-methoxy-13β-n-propyl-des-A-Δ$^{5,7,9}$-gonatriene-17β-ol in 480 cc. of pure acetone was cooled to +2° C. and within a space of 5 minutes the following solution was introduced:

| | |
|---|---|
| Chromic acid anhydride | gm 7.65 |
| Water | cc 76.5 |
| Concentrated sulfuric acid | cc 7.6 |

Next the reaction mixture was agitated for 3 hours at +20° C., then 8.5 cc. of methanol were introduced. The mixture was further agitated for another 15 minutes, then poured into 4,750 cc. of water. The aqueous mixture was extracted with methylene chloride. The extracts were washed first with an aqueous saturated solution of sodium bicarbonate, and thereafter with water until the wash waters were neutral and finally dried. The extract was then evaporated under vacuum to dryness, and the solid residue obtained was crystallized from isopropyl ether. After vacuum filtering and drying 19.2 gm. of 5-methoxy-13β-n-propyl-Δ$^{5,7,9}$-des-A-gonatriene-17-one (II), were isolated. This product occurred in the form of colorless crystals, having a melting point of 95° C. and a specific rotation [α]$_D$=+67.7° (c.=0.5% in methanol).

The product was insoluble in water, and soluble in acetone, benzene and methylene chloride.

This compound is not described in the literature.

*Step II: 5-methoxy-13β-n-propyl-17α-ethynyl-Δ$^{5,7,9}$-des-A-gonatriene-17β-ol (III)*

A solution of lithium acetylide in a benzene-tetrahydrofuran media was prepared by allowing acetylene to bubble through a mixture of 1560 cc. of tetrahydrofuran and 1560 cc. of a normal solution of butyl-lithium in benzene over a period of 3 hours at 30–35° C.

This solution was heated to 50° C. and, over a period of 5 minutes, 12.5 gm. of 5-methoxy-13β-n-propyl-Δ$^{5,7,9}$-des-A-gonatriene-17-one (II), dissolved in 175 cc. of tetrahydrofuran, were introduced. The mixture was heated to reflux for 2 hours, then cooled to 0° C., and within a period of 30 minutes, without exceeding 20° C., 3000 cc. of an aqueous saturated solution of ammonium chloride were introduced therein.

The solution was decanted. The aqueous phase was separated and extracted with ether. The combined organic phases were washed with water, dried over sodium sulfate and evaporated to dryness.

A resin was thus obtained, which was dissolved in methylene chloride and subjected to chromatography through silica gel. On elution with methylene chloride containing 2% of acetone, 12.17 gm. of 5-methoxy-13β-n-propyl-17α-ethynyl-Δ$^{5,7,9}$-des-A-gonatriene-17β-ol (III), were obtained. This product was utilized as such for the following step.

This compound is not described in the literature.

*Step III: 5-methoxy-13β-n-propyl-17β-acetoxy-17α-ethynyl-Δ$^{5,7,9}$-des-A-gonatriene (IV, Ac=CH$_3$CO)*

To a solution of 12.11 gm. of 5-methoxy-13β-n-propyl-17α-ethynyl-Δ$^{5,7,9}$-des-A-gonatriene-17β-ol (III), in 121 cc. of acetic acid anhydride, 6.055 gm. of p-toluene sulfonic acid monohydrate were added at a temperature of 25° C. For a period of 20 hours this mixture was agitated at a temperature of 20–25° C. Then, 600 cc. of water were introduced in the reaction mixture and it was agitated for 2 hours at 20–25° C. The aqueous mixture was extracted with methylene chloride. The combined organic phases were washed successively with water, then with a saturated solution of sodium bicarbonate and finally with water until the wash waters were neutral, dried over sodium sulfate and evaporated under vacuum to dryness. In this manner a resin was obtained, which was dissolved in methylene chloride and subjected to chromatography through silica gel. On elution with methylene chloride containing 1% of acetone, 11.91 gm. of 5-methoxy-13β-n-propyl - 17β - acetoxy-17α-ethynyl-Δ$^{5,7,9}$-des-A-gonatriene (IV, with Ac=CH$_3$CO) were recovered. The product obtained was utilized as such for the following step.

This compound is not described in the literature.

*Step IV: 5-methoxy-13β-n-propyl-17β-acetoxy-17α-acetyl-Δ$^{5,7,9}$-des-A-gonatriene (V, with Ac=CH$_3$CO)*

Mercuric resin, a hydration catalyst, was prepared in the following manner: 400 cc. of Dowex 50 resin in acid form (having already undergone several cycles), 1,600 cc. of water and 43 cc. of concentrated sulfuric acid were agitated for 30 minutes. The mixture was decanted and the solid resin was washed repeatedly with water until the sulfate ions were absent. The resin thus obtained was introduced in 1,660 cc. of water containing in solution 5 gm. of mercuric acetate. The mixture was agitated for 10 minutes, decanted, then washed with water until no further mercuric ions were present in the wash water. 196 cc. of this mercuric ion-containing resin were filtered and introduced in a solution of 11.9 gm. of 5-methoxy-13β - n-propyl-17β-acetoxy-17α-ethynyl-Δ$^{5,7,9}$-des-A-gonatriene (IV, Ac=CH$_3$CO) in 95 cc. of ethanol. 200 cc. of ethanol were added thereto and the mixture was heated to reflux for 6 hours under agitation. The mixture was vacuum filtered at an elevated temperature and the resin residue was washed twice with 200 cc. of boiling ethanol. The various filtrates were combined, diluted with 2,360 cc. of methylene chloride, then washed 5 times with 400 cc. of water. The organic phase was then dried over sodium sulfate and evaporated to dryness under vacuum. A resin was obtained which was subjected to chromatography through a column of silica gel. On elution with methylene chloride containing 1% of acetone, 10.97 gm. of 5-methoxy-13β-n-propyl-17β-acetoxy-17α-acetyl-Δ$^{5,7,9}$-des-A-gonatriene (V, with Ac=CH$_3$CO), were recovered. The product was utilized as such for the following step.

This compound is not described in the literature.

*Step V: 13β-n-propyl-18,19-bis-nor-Δ$^9$-des-A-pregnene-5,20-dione (VII)*

625 cc. of anhydrous ammonia were condensed at a temperature of −75° C., and, within the space of 15 minutes, 1.75 gm. of lithium, cut into small pieces, were introduced therein. The mixture was agitated for a period of 30 minutes at −70° C., then, within a period of 10 minutes, 125 cc. of anhydrous ether were added thereto. Thereafter, within a period of 10 minutes, a solution of 2.5 gm. of 5-methoxy-13β-n-propyl-17β-acetoxy-17α-acetyl-Δ$^{5,7,9}$-des-A-gonatriene (V, with Ac=CH$_3$CO) in 125 cc. of anhydrous ether was added. Finally, within a period of 10 minutes, another 125 cc. of anhydrous ether were added. The reaction mixture was then subjected to a vigorous agitation, first for 2 hours at −70° C., then for 3 hours at −40° C. Then, at −40° C., 75 cc. of methanol were added within a period of 30 minutes. The ammonia was distilled from the reaction mixture and the temperature was allowed to rise to +20° C. Then, under agitation, first 625 cc. of methylene chloride, then 250 cc. of water were added. The mixture was allowed to separate, the organic phase was decanted and washed 3 times with 250 cc. of water.

Thereafter, 5 cc. of a 2:1 per volume mixture of methanol and concentrated hydrochloric acid were added and the mixture was heated to +70° C. to remove the ether and the methylene chloride. The mixture was held at +70° C. for 10 minutes, cooled to room temperature and an aqueous solution of sodium bicarbonate was added. The mixture was extracted with methylene chloride. The organic phase was washed with water, dried and evaporated to dryness under vacuum. In this manner, 2.34 gm. of a resin were obtained, which was dissolved under atmosphere of nitrogen in 42.5 cc. of methanol. 4.7 cc. of concentrated hydrochloric acid were added thereto and the mixture was heated at reflux for 10 minutes. The reaction mixture was cooled to room temperature and poured into a saturated aqueous solution of sodium bicarbonate. This aqueous mixture was then extracted with methylene chloride. The organic phase was washed with water and dried.

The extract was then evaporated to dryness and a resin was obtained which was dissolved in 43.6 cc. of pure acetone. To this solution, cooled to 0° C., within a period of 3 minutes, the following solution was added:

Chromic acid anhydride _____mg__ 665
Concentrated sulfuric acid _____cc__ 0.66
Water _____cc__ 6.6

This reaction mixture was agitated for 3 hours at 20–25° C. 7.4 cc. of methanol were then introduced into this mixture, which was agitated for a further 5 minutes.

Then the mixture was poured into 400 cc. of water. The aqueous mixture was extracted with methylene chloride. The organic phase was washed, first with a saturated aqueous solution of sodium bicarbonate, then with water and dried. The organic phase was then evaporated to dryness under atmosphere of nitrogen and 1.15 gm. of resin was obtained.

To the aqueous phase, already once extracted with methylene chloride, 250 cc. of a saturated aqueous solution of sodium chloride were added, and the solution was again extracted with methylene chloride. By an identical treatment, a further 0.85 gm. of resin was recovered.

The two resins were combined by dissolving them in 4 cc. of isopropyl ether heated to reflux. On cooling, 440 mg. of crystals were separated, which, recrystallized from isopropanol, yielded 370 mg. of 13β-n-propyl-18,19-bis-nor-Δ⁹-des-A-pregnene-5,20-dione (VII). This product had a melting point of 167° C. and a specific rotation $[\alpha]_D = +46.6° \pm 0.5$ (c.=0.8% in methanol).

The product occurred in the form of colorless crystals insoluble in water, slightly soluble in hot isopropanol and soluble in methylene chloride.

This compound is not described in the literature.

*Step VI: 5-pyrrolidyl-13β-n-propyl-18,19-bis-nor-Δ⁵⁽¹⁰⁾,⁹⁽¹¹⁾-des-A-pregnadiene-20-one*

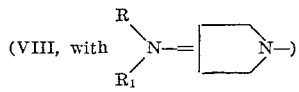

A mixture of 200 mg. of 13β-n-propyl-18,19-bis-nor-Δ⁹-des-A-pregnene-5,20-dione (VII), and 0.4 cc. of pyrrolidine was heated for 10 minutes at 88° C., then cooled to 0° C. The mixture was diluted with 2 cc. of methanol, iced and vacuum filtered. The crystals were washed with a small amount of iced methanol. After drying under vacuum, 200 mg. of product were obtained, which was recrystallized from the dimethylformamide. 113 mg. of 5 - pyrrolidyl-13β-n-propyl-18,19-bis-nor-Δ⁵⁽¹⁰⁾,⁹⁽¹¹⁾-des-A-pregnadiene-20-one

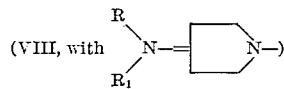

were isolated, having a melting point of 171° C. and a specific rotation $[\alpha]_D = +213° \pm 1$ (c.=0.66% in benzene).

The product occurred in the form of yellow crystals, insoluble in water, methanol, and soluble in benzene.

This compound is not described in the literature.

*Step VII: 3-chloro-13β-n-propyl-18,19-bis-nor-4,5-seco-Δ²,⁹-pregnadiene-5,20-dione (IX)*

While operating in the absence of light and at a temperature of 0° C., 500 mg. of 5-pyrrolidyl-13β-n-propyl-18,19-bis-nor-Δ⁵⁽¹⁰⁾,⁹⁽¹¹⁾-des-A-pregnadiene-20-one

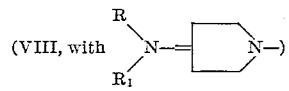

were added to 2 cc. of a potassium iodide solution in dimethylformamide, testing 11.5 gm. for 100 cc. The mixture was maintained at 0° C. for 15 minutes, then 0.21 cc. of freshly distilled 1,3-dichloro-2-butene were added. The mixture was agitated for 4 hours at 0° C. under atmosphere of nitrogen. Next, 0.4 cc. of water was added thereto and the temperature was raised to 90° C. within a period of 30 minutes and maintained at this temperature for 2 hours. The mixture was then cooled to room temperature, diluted with 20 cc. of water and extracted with methylene chloride. The extract was washed with water, dried and evaporated to dryness. The residue was dissolved in methylene chloride and purified by passing it through "Florisil." After evaporation, 500 mg. of product were obtained.

After recrystallization from isopropyl ether, 335 mg. of 3-chloro-13β-n-propyl-18,19-bis-nor-4,5-seco-Δ²,⁹-pregnadiene-5,20-dione (IX) were isolated, having a melting point of 134° C., and a specific rotation $[\alpha]_D = +43.7°$ (c.=0.5% in methanol).

The product occurred in the form of colorless crystals, insoluble in water, and soluble in ethanol and methylene chloride.

This compound is not described in the literature.

*Step VIII: 13β-n-propyl-18,19-bis-nor-4,5-seco-Δ⁹-pregnene-3,5,20-trione (X)*

A solution of 200 mg. of 3-chloro-13β-n-propyl-18,19-bis-nor-4,5-seco-Δ²,⁹-pregnadiene-5,20-dione (IX) in 0.3 cc. of methylene chloride was cooled to 0° C. and, under agitation, 1 cc. of concentrated sulfuric acid was added thereto. The reaction mixture was maintained under agitation at 18° C. for a period of 15 minutes. Next, 10 cc. of a mixture of ice and water were rapidly introduced and the aqueous mixture was extracted with methylene chloride. The organic phase was washed, first with a saturated aqueous solution of sodium bicarbonate, then with water until the wash waters were neutral and dried.

The organic solution was evaporated to dryness and the crystallized residue was triturated with isopropyl ether. 120 mg. of 13β-n-propyl-18,19-bis-nor-4,5-seco-Δ⁹-pregnene-3,5,20-trione (X), were obtained, having a melting point of 97° C. and a specific rotation $[\alpha]_D = +40.1°$ (c.=0.5% in methanol).

The product occurred in the form of colorless crystals insoluble in water, and soluble in ethanol and methylene chloride.

This compound is not described in the literature.

*Step IX: 13β-n-propyl-18,19-bis-nor-4,5-seco-pregnane-3,5,20-trione (XI)*

A solution of 285 mg. of 13β-n-propyl-18,19-bis-nor-4,5-seco-Δ⁹-pregnene-3,5,20-trione (X) in 5.7 cc. of 95% ethanol was placed in a hydrogenation apparatus. Under atmosphere of nitrogen, 20 mg. of palladized carbon black and 0.12 cc. of triethylamine were added. The nitrogen was eliminated and the reaction mixture was agitated under an atmosphere of hydrogen for 3 hours at 25° C. After reduction, the mixture was vacuum filtered and the catalyst was washed with ethanol. The filtrates were combined and evaporated under vacuum. A resin was obtained which was triturated with isopropyl ether. In this manner, 230 mg. of 13β-n-propyl-18,19-bis-nor-4,5-seco-pregnane-3,5,20-trione (XI), in the form of colorless crystals, were isolated, having a melting point of 118° C. and a specific rotation $[\alpha]_D = +92.5$ (c.=0.5% in methanol).

The product was insoluble in water and isopropyl ether, and slightly soluble in ethanol and isopropanol.

This compound is not described in the literature.

*Step X: 3-pyrrolidyl-13β-n-propyl-18,19-bis-nor-Δ³,⁵-pregnadiene-20-one (XII)*

A mixture of 1.25 cc. of pyrrolidine and of 125 mg. of 13β-n-propyl-18,19-bis-nor-4,5-seco-pregnane - 3,5,20-trione (XI) was maintained under atmosphere of nitrogen for 20 minutes at a temperature of 87° C. Then, the excess of pyrrolidine was removed with a stream of nitrogen and the mixture was cooled. The crystallized residue thus obtained was triturated in 2.5 cc. of methanol, iced and vacuum filtered.

After drying the residue under vacuum, 118 mg. of 3-pyrrolidyl - 13β - n - propyl-18,19-bis-nor-Δ³,⁵-pregnadiene-20-one (XII) were obtained in the form of crystals with a melting point of 192° C. The product was utilized as such for the following step.

This compound is not described in the literature.

*Step XI: 13β-n-propyl-18,19-bis-nor-progesterone (I)*

118 mg. of 3-pyrrolidyl-13β-n-propyl-18,19-bis-nor-Δ³,⁵-pregnadiene-20-one (XII), were dissolved in 0.12 cc.

of acetic acid. The solution was allowed to stand at rest for 5 minutes, then 1.2 cc. of water was added and the reaction mixture was maintained for 1 hour at 20–25° C. Next 0.17 cc. of a solution of sodium hydroxide was added. A precipitate was formed which was vacuum filtered, washed until the wash waters were neutral and dried under vacuum. This precipitate was crystallized from isopropyl ether. In this way, 78 mg. of 13β-n-propyl-18,19-bis-nor-progesterone (I), were isolated in the form of colorless crystals, having a melting point of 156° C. The purification of this compound, by recrystallization from isopropyl ether, gave a sample having a melting point of 156° C., and a specific rotation $[\alpha]_D = +149.5° \pm 1$ (c.=0.47% in methanol).

The product was insoluble in water and soluble in ethanol.

*Analysis.*—$C_{22}H_{32}O_2$; molecular weight=328.48. Calculated: C, 80.44%; H, 9.82%. Found: C, 80.40; H, 9.70.

This compound is not described in the literature.

The preceding specific embodiment is illustrative of the practice of the invention. It is to be understood, however, that other expedients known to those skilled in the art may be employed without departing from the spirit of the invention or the scope of the appended claims.

We claim:
1. 13β - n - propyl-18,19-bis-nor-4,5 -seco-pregnane-3,5,20-trione.
2. 3-pyrrolidyl-13β-n-propyl - 18,19 - bis-nor-$\Delta^{3,5}$-pregnadiene-20-one.
3. A process for the production of 13β-n-propyl-18,19-bis-nor-progesterone of the formula

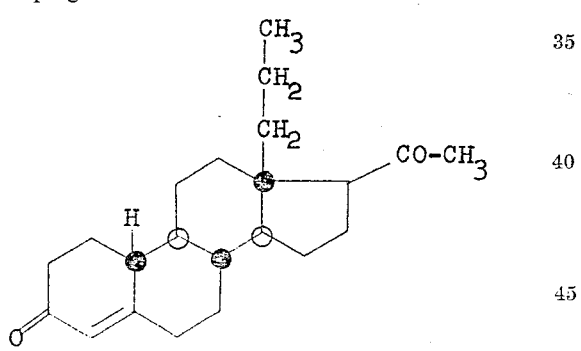

which comprises the steps of:
 (a) reacting 5-methoxy-13β-n-propyl - $\Delta^{5,7,9}$ - des-A-gonatriene-17β-ol with a chromic acid anhydride oxidizing agent,
 (b) ethynylating the resulting 5-methoxy-13β-n-propyl-$\Delta^{5,7,9}$-des-A-gonatriene-17-one by the action of an alkali metal acetylide ethynylating agent,
 (c) esterifying the resulting 5-methoxy-13β-n-propyl-17α-ethynyl-$\Delta^{5,7,9}$-des-A-gonatriene-17β-ol by the action of an esterifying derivative of an organic carboxylic acid having from 2 to 7 carbon atoms,
 (d) hydrating the ethynyl function of the resulting ester of the formula

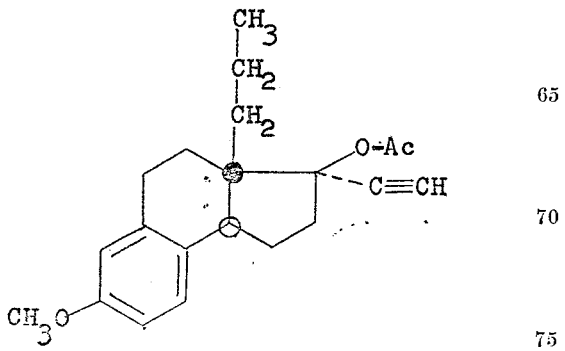

wherein Ac represents the acyl of an organic carboxylic acid having from 2 to 7 carbon atoms, by the action of water in the presence of a mercuric hydration catalyst,
 (e) reducing the resulting 17α-acetyl-gonatriene of the formula

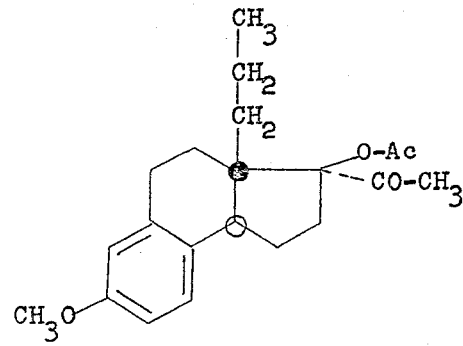

wherein Ac represents the acyl of an organic carboxylic acid having from 2 to 7 carbon atoms, by the action of an alkali metal in liquid ammonia and subjecting the resulting product to an acid hydrolysis,
 (f) reacting the resulting 13β-n-propyl-18,19-bis-nor-$\Delta^9$-des-A-pregnene-20-ol-5-one with a chromic acid anhydride oxidizing agent,
 (g) reacting the resulting 13β-n-propyl-18,19-bis-nor-$\Delta^9$-des-A-pregnene-5,20-dione with a secondary amine of the formula

wherein R and $R_1$ are members selected from the group consisting of alkyl having from 1 to 8 carbon atoms and, when taken together with the nitrogen, pyrrolidyl, piperidyl and morpholyl,
 (h) reacting the resulting enamine of the formula

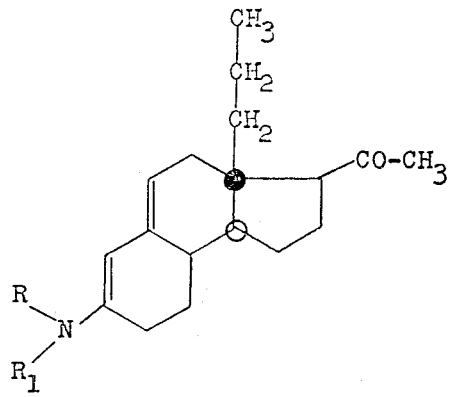

wherein R and $R_1$ are members selected from the group consisting of alkyl having from 1 to 8 carbon atoms and, when taken together with the nitrogen, pyrrolidyl, piperidyl and morpholyl, with 1-halo-3-chloro-2-butene in an organic solvent,
 (i) reacting the resulting 3-chloro-13β-n-propyl-18,19-bis-nor-4,5-seco-$\Delta^{2,9}$-pregnadiene-5,20-dione with an acid hydrolyzing agent,
 (j) reducing the resulting 13β-n-propyl-18,19-bis-nor-4,5-seco-$\Delta^9$-pregnene-3,5,20-trione by the action of hydrogen in the presence of a hydrogenation catalyst,
 (k) cyclizing the resulting 13β-n-propyl-18,19-bis-nor-4,5-seco-pregnane-3,5,20-trione by the action of a cyclizing agent selected from the group consisting of hydrochloric acid and pyrrolidine cyclizing agents, and
 (l) recovering said 13β-n-propyl-18,19-bis-nor-progesterone.

4. The process of claim 3, step (a) wherein said reaction is conducted in the presence of sulfuric acid in an acetonic media.

5. The process of claim 3, step (b) wherein said ethynylating agent is lithium acetylide in a benzene-tetrahydrofuran media.

6. The process of claim 3, step (c) wherein said esterifying derivative of an organic carboxylic acid having from 2 to 7 carbon atoms is acetic acid anhydride in the presence of p-toluene sulfonic acid as a catalyst.

7. The process of claim 3, step (d) wherein said hydration catalyst is a mercuric catalyst selected from the group consisting of the mercury salt of p-toluene sulfonamide and an ion exchange resin containing mercuric cations and the reaction is conducted in an aqueous-alkanolic media.

8. The process of claim 3, step (e) wherein said alkali metal is lithium and the reducing reaction is conducted in the presence first of diethyl ether and then of methanol and the subsequent acid hydrolysis is effected by a strong mineral acid.

9. The process of claim 3, step (f) wherein said reaction is conducted in the presence of sulfuric acid and in an acetonic media.

10. The process of claim 3, step (g) wherein said secondary amine is pyrrolidine and the reaction is conducted at elevated temperatures up to the reflux temperature.

11. The process of claim 3, step (h) wherein said 1-halo-3-chloro-2-butene is 1,3-dichloro-2-butene and the reaction is conducted in dimethylformamide in the presence of potassium iodide.

12. The process of claim 3, step (i) wherein said acid hydrolyzing agent is concentrated sulfuric acid.

13. The process of claim 3, step (j) wherein said hydrogenation catalyst is palladized carbon black and the reaction is conducted in the presence of a small amount of triethylamine in an alkanolic media.

14. The process of claim 3, step (k) wherein said cyclizing agent is hydrochloric acid in acetic acid and 13$\beta$-n-propyl-18,19-bis-nor-progesterone is recovered.

15. The process of claim 3, step (k) wherein said cyclizing agent is pyrrolidine and 3-pyrrolidyl-13$\beta$-n-propyl-18,19-bis-nor-$\Delta^{3,5}$-pregnadiene-20-one is recovered, which compound is subjected to an acid hydrolysis to give 13$\beta$-n-propyl-18,19-bis-nor-progesterone.

References Cited by the Examiner
UNITED STATES PATENTS
3,155,660   11/1964   Nomine et al. ____ 260—247.7

OTHER REFERENCES
Fieser et al.: Steroids, p. 589 (1959), Reinhold Publ. Co. (New York).

LEWIS GOTTS, *Primary Examiner.*

HENRY A. FRENCH, *Assistant Examiner.*

PO-1050
(5/69)

UNITED STATES PATENT OFFICE
CERTIFICATE OF CORRECTION

Patent No. 3,311,616           Dated March 28, 1967.

Inventor(s)     GERARD NOMINE et al

It is certified that error appears in the above-identified patent and that said Letters Patent are hereby corrected as shown below:

Column 1, Line 8

French Priority Application PV 968,659, dated March 25, 1964, was not indicated in the patent.

Signed and sealed this 9th day of May 1972.

(SEAL)
Attest:

EDWARD M. FLETCHER, JR.
Attesting Officer

ROBERT GOTTSCHALK
Commissioner of Patents